July 6, 1948.   P. MOSNER ET AL   2,444,708
INSTRUMENT FOR NAVIGATION
Filed Nov. 25, 1942   5 Sheets-Sheet 1

INVENTORS:
PETER MOSNER AND OTTO STEINITZ
BY Otto Steinitz
AGENT

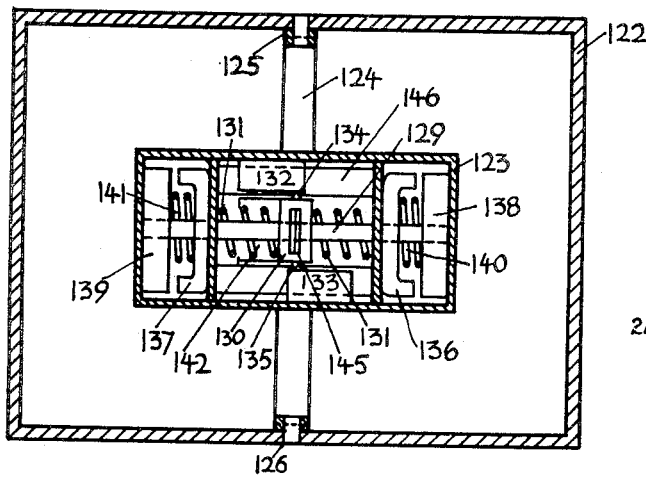
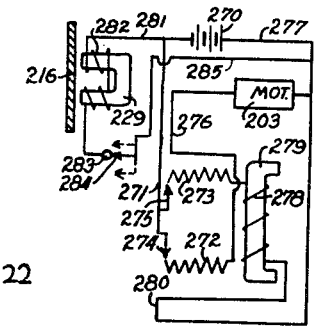
fig.4
fig.14
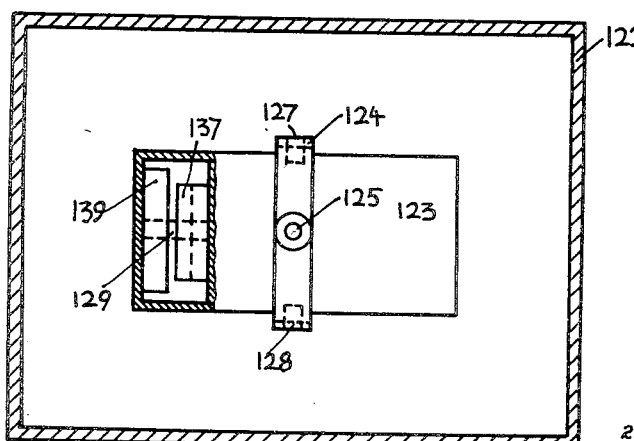
fig.5
fig.13
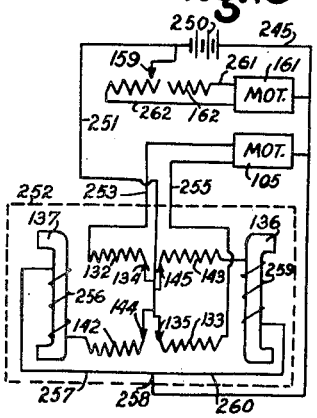
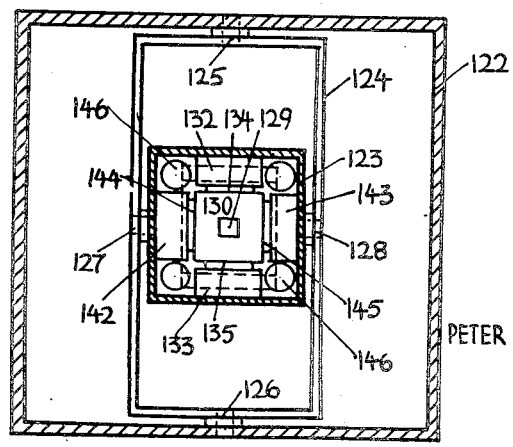
fig.6
INVENTORS:
PETER MOSNER AND OTTO STEINITZ
BY Otto Steinitz
AGENT.

July 6, 1948.  P. MOSNER ET AL  2,444,708
INSTRUMENT FOR NAVIGATION
Filed Nov. 25, 1942  5 Sheets-Sheet 4
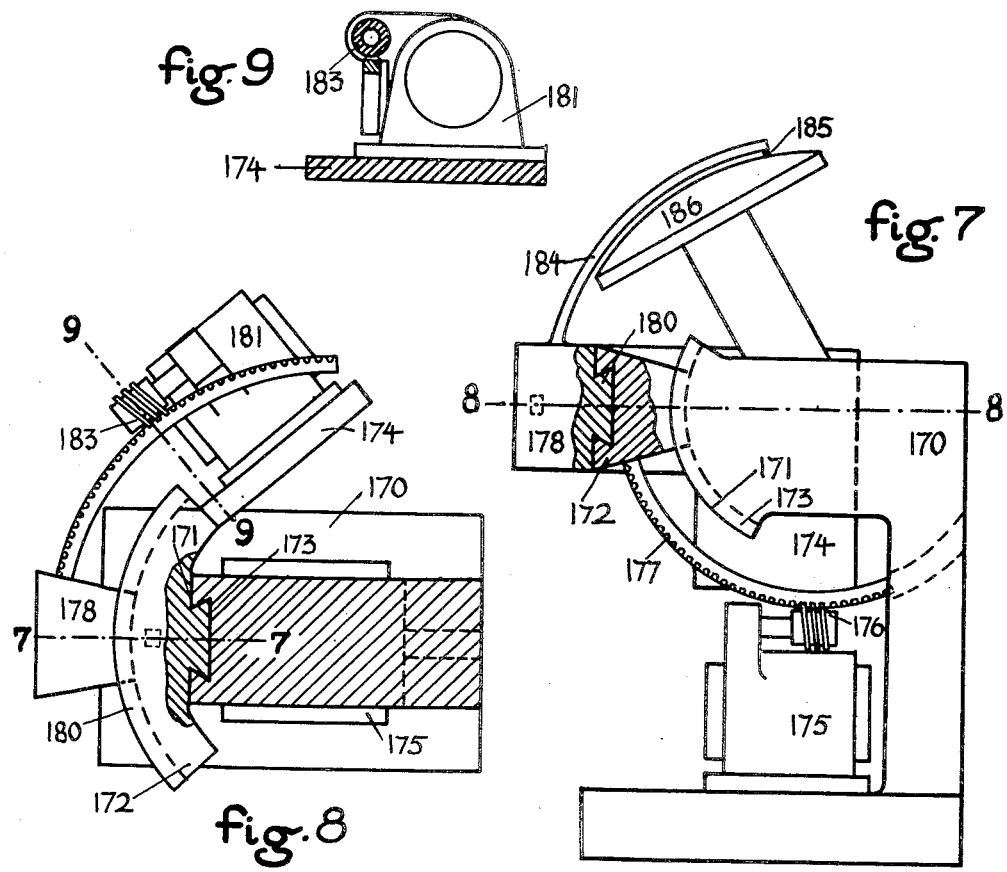
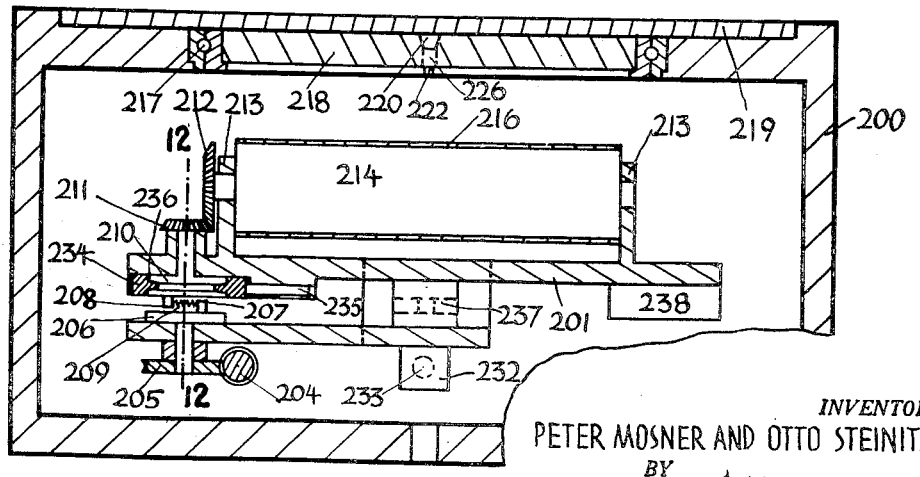
INVENTORS:
PETER MOSNER AND OTTO STEINITZ
BY
Otto Steinitz
AGENT.

Patented July 6, 1948

2,444,708

UNITED STATES PATENT OFFICE 2,444,708

INSTRUMENT FOR NAVIGATION

Peter Mosner, Alexandria, Va., and Otto Steinitz, New York, N. Y.

Application November 25, 1942, Serial No. 466,934

2 Claims. (Cl. 264—1)

This invention relates to instruments used in airplanes for navigation, and the main object of the invention is to make possible, to facilitate or to improve navigation independently of any visibility of the ground, of radio beams or of any other kind of reference to outer marks. The invention is useful whenever navigation without reliance on stationary reference points is necessary or desirable, and we desire it understood that, speaking of airplanes, we include dirigibles and all other vehicles which may lose contact with or view of stationary marks.

A more particular object is to indicate the existence of any acceleration. "Acceleration," in this specification, means any change of the vehicles' progressive moving condition, whether the acceleration results in a change of the velocity or of the moving direction or of both. For the purposes of this invention, all parts rigidly connected to the vehicle may be regarded as having the same progressive movement and the same accelerations, mere changes of the vehicle's direction or orientation in space resulting only in turning around the vehicle's center of gravity and in negligible temporary differences of moving conditions between the individual parts of the vehicle.

Another object is to indicate the direction of any acceleration. Still other objects are to indicate the intensity or magnitude and the duration of any acceleration.

Further objects are to indicate changes of the vehicle's moving direction, to indicate the moving direction relative to the ground at any given time, and to indicate the wind drift angle, that is the angular deviation of the moving direction from the airplane's heading. Still further objects are to indicate the magnitude of changes of velocity, to indicate the velocity relative to the ground at any given time, and to indicate the present speed, that is the vector defined by moving direction and velocity at any given time.

Still further objects are to indicate the distance or mileage made by the vehicle in horizontal direction, the altitude, the way or track relative to the ground, and the position of the vehicle at any given time.

The indications mentioned in the foregoing supply data which may be used singly or in combination, either by a person steering the vehicle or by wholly or partly automatic device responsive to one or more indications and controlling the vehicle's navigation.

According to the invention, said indications can be achieved independently of any outer source by means of a member carried by the vehicle which member, due to its inertia, has a tendency to shift its center of gravity relatively to the remaining structure of the vehicle when the latter is accelerated. Thus, further objects are to use the inertia of a member carried by the vehicle in order to indicate accelerations and to derive one or more of the indications mentioned before from the indication of acceleration.

Other objects and advantages of the invention will appear from the exemplifying embodiments described in the following description, particularly pointed out in the attached claims and illustrated in the accompanying drawings in which:

Fig. 1 shows a vertical view of an illustrative embodiment, said view being seen from the lower side of Fig. 3, that part of this embodiment which is shown in the lower half of Fig. 3 being cut off along the line 1—1 in Fig. 3, Fig. 2 shows a vertical view of the main body of the embodiment shown in Fig. 1, said view seen from the left side in Fig. 1, Fig. 3 shows a view of the embodiment shown in Fig. 1, said view seen obliquely from above in the direction of the arrow 12 in Fig. 1, Fig. 4 shows a vertical view of an element used in the embodiment shown in Figs. 1 and 3, said view being on a larger scale and showing some parts in central cross-sections, Fig. 5 shows a horizontal view of the element shown in Fig. 4, some parts being shown in central cross-sections, Fig. 6 shows a vertical view of the element shown in Figs. 4 and 5, said view being perpendicular to the Figs. 4 and 5 and showing some parts in central cross-sections, Fig. 7 shows a vertical view of a modification of the embodiment shown in Figs. 1, 2 and 3, some parts being shown in cross-section along the lines 7—7 in Fig. 8, Fig. 8 shows a horizontal view of the modification shown in Fig. 7, some parts being shown in cross-section along the line 8—8 in Fig. 7, Fig. 9 shows a portion of the modification shown in Figs. 7 and 8, said view being seen from a cross-section taken along the line 9—9 in Fig. 8, Fig. 10 shows another embodiment of the invention, the casing being shown in central cross-section, some parts being omitted, and some inner parts shown in a cross-section taken along the line 10—10 and seen from the right side in Fig. 12.

Fig. 11 shows the embodiment shown in Fig.

10 seen from the upper side, some parts of the periphery being broken off, and some of the invisible parts being shown in dotted lines.

Fig. 13 shows a circuit diagram adapted for use in the embodiments shown in Figs. 1 to 9.

Fig. 14 shows a circuit diagram adapted for use in the embodiments shown in Figs. 10 to 12.

Each of the shown embodiments comprises a structure or a body carried by the vehicle and participating in the vehicle's progressive motions and accelerations; at least one member having, due to its inertia, a tendency to shift its center of gravity relative to said body, when said body is accelerated; and means to indicate said tendency. In certain embodiments, said indicating means may be constituted by said member itself. For the sake of brevity, we call said body "the main body" and said member "the inert member". In all embodiments, the movability of the inert member relative to the main body is restricted, either by immediate contact or by interposed means, and either rigidly or resiliently.

The inert member need not necessarily be a solid body.

Every embodiment of the invention which achieves an indication of the direction and magnitude of the vehicle's accelerations or of the vectors of acceleration may be made the fundamental element of an instrument indicating the direction and the velocity of the vehicle or the vehicle's speed vector which is the geometrical sum of all occurred accelerations. Further, every embodiment indicating the speed vector may be made the basis of an instrument indicating the track or way of the vehicle, the distance or altitude or geographic position reached by the vehicle, all these indications resulting from the vehicle's speed during the travelling time. In order to obtain these objects, the device responsive to the accelerations is combined with suitable means for summing up the vectors of acceleration or the vectors of speed, for example with such means as will be described in connection with the following embodiments.

In the latter or other cases, it is necessary or desirable to maintain the direction or orientation in space of that part of the device which is responsive to the acceleration or also of other parts thereof. This object may be achieved by and suitable means, for example by such means as will be described in connection with the following embodiments.

Every embodiment may be equipped with means to arrest the movable parts of the instrument temporarily when no indication is desired whereby the instrument is protected from damage, for example, during acrobatics or other abrupt flight maneuvers. Further, the device may be provided with a protective casing having a window for the observation of the scale and with other conventional equipments.

Figure 1:
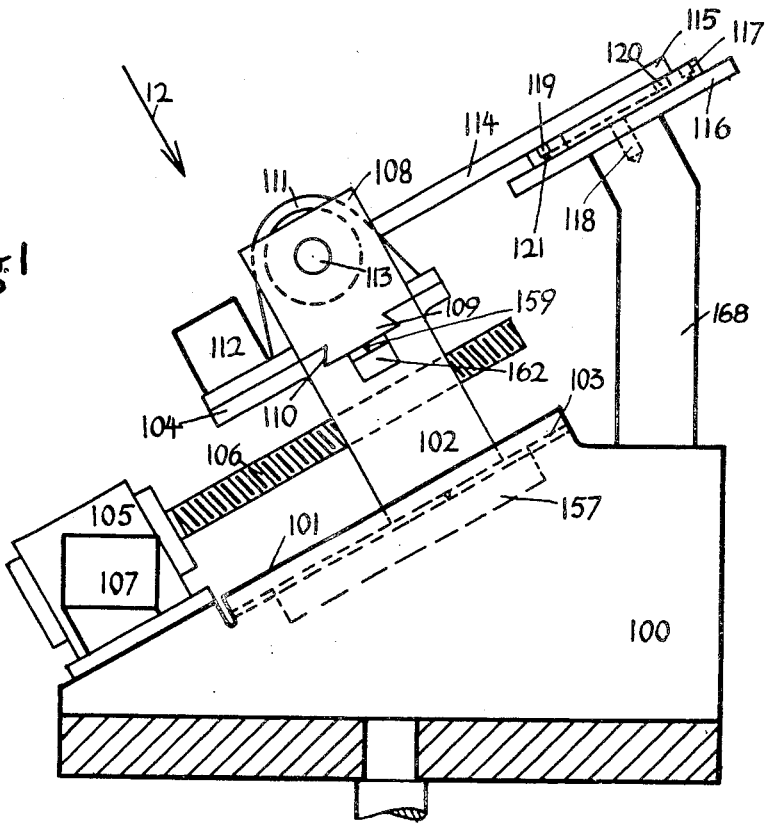
Figure 2:
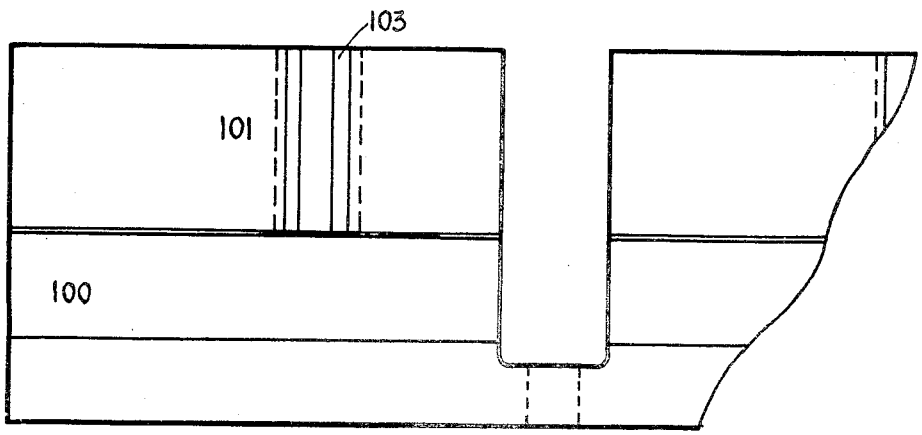
Figure 3:
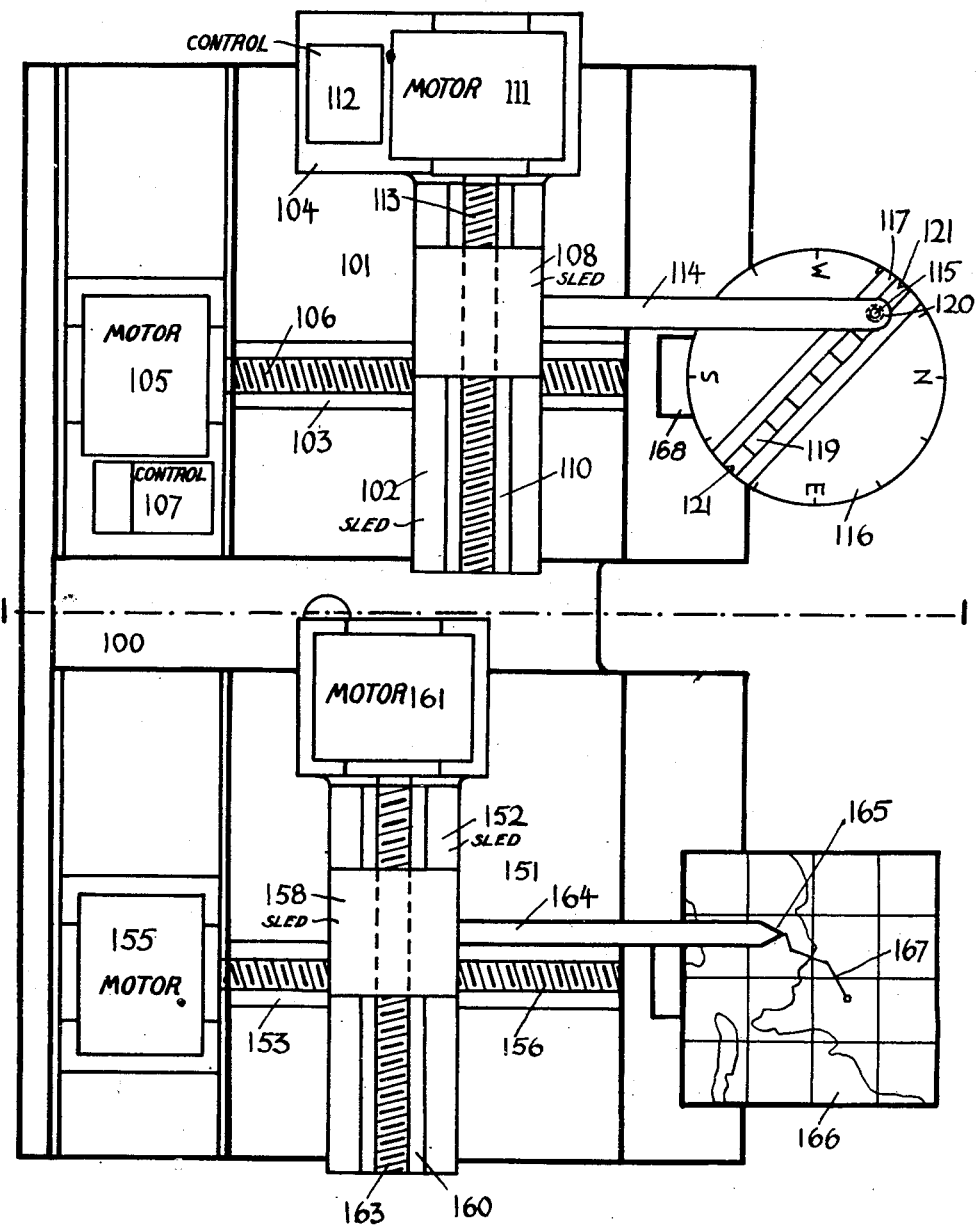

Referring to Figs. 1, 2 and 3, numeral 100 indicates a main or mounting body supporting the inventive device. The body 100 has a finished surface 101 over which a sled 102 can slide. The sliding movement of the sled 102 is guided by a groove 103 provided in the surface 101 and having oblique side walls similar to the groove 110 which will be described later on, said side walls slidably fitting a lower extension of the sled 102, similar to the extension 109 of the later described sled 108.

A motor 105 is mounted on the body 100 and drives a shaft 106 having a thread engaging a corresponding thread provided in a bore of the sled 102 whereby rotation of the shaft 106 moves the sled 102 in the one or the other axial direction of said shaft. The operation of the motor 105 is controlled by a control element 107 mounted on the body 100 in such position that the "axis" of the element 107 is horizontal. The structure of the element 107 and the meaning of its "axis" will be described later on, with reference to Figs. 4, 5 and 6.

The sled 102 has a finished upper surface which slidably carries a second sled 108 having a lower extension 109 which slidably fits the side walls of a groove 110 provided in said surface of the sled 102. The directions of the grooves 103 and 110 are perpendicular to each other, and, consequently, the sliding directions of the sleds 102 and 108 are perpendicular to each other.

An extension or integral part 104 of the sled 102 carries a motor 111 and a control element 112 similar to the element 107 and controlling the operation of the motor 111. The element 112 is so positioned that its "axis" is horizontal and perpendicular to the "axis" of the element 107. The motor 111 drives a shaft 113 having a thread engaging a corresponding thread provided in a bore of the sled 108 whereby rotation of the shaft 113 moves the sled 108 in the one or the other direction of the axis of the shaft 113.

A rod or indicator 114 has one end affixed to the sled 108 and another end 115 positioned over a plate 116 which is affixed to the body 100 by a post 168. The plate 116 is so positioned that its upper surface is parallel to those movements of the end 115 which occur when the sleds 102 and 108 move. A bar or pointer 117 is rotatably mounted on the plate 116 by means of a pin or small shaft 118 extending from the central part of the bar 117 to the lower side and engaging a central bore in the plate 116. The bar 117 has a longitudinal groove 119 which is slidably engaged by a cylindrical pin 120 affixed to the end 115. When the pin has left the position over the center of the plate 116, the bar 117 assumes a definite angular position which is indicated at a scale on the periphery of the plate 116 by small recesses 121 provided at the ends of the bar 117. On the bottom of the groove 119, another scale is marked and can be observed through a hole in the center of the pin 120 and in the end 115. This latter scale indicates the radial distance of the pin 120 from its central position.

Figs. 4, 5 and 6 show the control element 107 on a larger scale. These figures may be also regarded as illustrations of the element 112, the elements 107 and 112 being of identical or similar structure.

The element 107 comprises an outer casing 122 and an inner casing 123 which are connected by a gimbal suspension consisting of a ring or frame 124 rotatably connected to the outer casing 122 by joints 125, to the inner casing 123 by joints 128. A slide-bar 129 is affixed to the casing 123 in the inner side thereof. The longitudinal axis of said bar defines the direction of movability of a member 130 slidably carried by the bar 129. Said axis along which the center of gravity of the member 130 can move is regarded as the "axis" of the element 107.

Two coiled springs 131 surrounding the bar 129 are inserted in the casing 123 at both sides of the member 130 and keep said member in its central position when no acceleration exists. Any acceleration of the element which has a component or coordinate in the direction of the element's axis causes the member 130 to move relatively to the casing 123, due to the law of inertia, until the forces exerted by the springs 131 counterbalance the force of inertia which is proportional to the magnitude or intensity of said accelerating component.

The casing 123 further contains two variable resistances 132 and 133 arranged beside the member 130 and adjustable by sliding contacts 134 and 135 which are affixed to the member 130. Any movement of the member 130 to the left side (Fig. 4) causes the sliding contact 134 to vary the resistance 132. Any movement of the member 130 to the right side causes the sliding contact 135 to vary the resistance 133. The resistances 132 and 133 are so arranged and measured that the speed of the motor 105 (Figs. 1 and 3) is controlled by the one or the other of said resistances and that said rotating speed is always proportional to the distance of the member 130 from its central position or to the intensity of the present accelerating component and that the direction of the motor's rotation is determined by the direction in which the member 130 has moved from its central position, the two resistances 132 and 133 operating the motor 105 in opposite directions. The structure of such resistances and of such a motor is known.

For example, motors are known, the speed of which is controlled by a circuit regulated by a resistance of which more or less portions can be inserted in said circuit by means of a sliding contact. Such an arrangement may be used in the instant embodiments, and the resistance may be adapted to the requirements of the instant invention in the following way: The range of the motor's speed from zero to maximum speed is divided into a large number of equal steps. The way of the sliding contact from its central starting position (corresponding to the standtill of the motor) to its uttermost position (corresponding to the highest speed of the motor) is divided into the same number of steps having equal lengths. The total resistance required for said range of speed is divided into the same number of partial resistances, each partial resistance corresponding to one step of the motor's speed and having a value which effects the change of speed of said step when added to or eliminated from the circuit. The partial resistances may be unequal, but their values are either known or can be easily found by simple test. Said partial resistances are so arranged along the way of the sliding contact that each partial resistance lies within the corresponding step of said way. Thereby any position of the sliding contact results in a motor's speed proportional to the total shift of said contact from its central position.

The current source, the motor and the resistances are connected by wires or conductors in conventional manner. Those parts of the conductors which bridge over the distance from the outer casing 122 to the inner casing 123 must not interfere with the movability of the gimbal suspension. This can be achieved in any known manner; for example, by using very resilient wires, or sliding contacts or by conducting the circuit through insulated parts of the gimbal ring and of its joints.

The casing 123 further contains an electromagnet 136 which is excited by coils (not shown) forming a part of the circuit controlled by the resistance 133, and a similar, oppositely directed magnet 137 excited by coils forming a part of the circuit controlled by the resistance 132. Counterweights 138 and 139 are so arranged slidably on the bar 129 and in the fields of the magnets 136 and 137 respectively that either of said magnets, when excited, attracts the respective counterweight whereby said counterweight moves in the direction toward the respective magnet against the pressure of a spring 140 or 141 respectively and against the force of inertia. This direction is opposite to the direction in which the member 130 is shifted from its central position at the same time. The counterweights 138 and 139, the springs 140 and 141 and the electromagnets 136 and 137 are so arranged and measured that the shift of the respective counterweight is proportional to the shift of the member 130, and that the ratio of said shifts is the inverse ratio of the shifted weights whereby the shift of the counterweight counterbalances the shift of the member 130 and the center of gravity of the entire system connected to the casing 123 retains its position.

If the arrangement of the resistances 132 and 133 should not allow a properly graduated control of the electromagnets 136 and 137, separate circuits and separate resistances 142 and 143 are used for said control, instead of the resistances used for the control of the motor. The resistances 142 and 143 are adjusted by sliding contacts 144 and 145 respectively which are carried by the member 130 similarly as the contacts 134 and 135. The resistances 142 and 143 are adapted to the operation of the electromagnets in a similar manner as the resistances 132 and 133 are adapted to the operation of the motor. Other means controlled by the shift of the member 130 may be used in order to control the operation of the electromagnets or of other means for such shift of the counterweights which secures the maintenance of the system's center of gravity.

The axis of the joints 125 and 126 and the axis of the joints 127 and 128 are so positioned that said axes cross each other at the element's center of gravity or at the center of gravity of the system connected to the casing 123 and suspended in the casing 122. Or the casing 123 may be arranged with its center of gravity perpendicularly under the center of suspension. At any rate, the axis of the element is so arranged that said axis has a definite and horizontal direction. Due to the gimbal suspension and the laws of inertia, the axis of the element always keeps its original direction. This may be further secured by known means, for example, by one or more gyroscopes 146 arranged in the casing 123 or by a compass needle controlling the direction of the casing 123. Gyroscopic and magnetic compasses for the maintenance of the direction of an axis are known, and, therefore, these devices are here not specified.

The gimbal suspension may be omitted, and the casings 122 and 123 may form one body if the body 100 is suspended by a similar, larger gimbal suspension. In this case, also means for the maintenance of the direction of the axis may be attached to the body 100 or to any part affixed to the body 100, and the center of gravity may be maintained by providing movable means so controlled that they counterbalance the shift of weight effected by the movable parts of the device.

Instead of controlling the motor's speed by a circuit, other means controlled by the shift of the member 130 may be used for this purpose, for example, a motor may be used the speed of which is controlled by a centrifugal regulator or by a centrifugal brake. Conventional structures of such speed controlling devices comprise an adjustable member which can be constituted or adjusted by a member shifted by inertia in a similar manner as the member 130.

The body 100 is carried by the vehicle and, whether or not in gimbal suspension, participates in the progressive motion of the vehicle, that is in that motion which shifts the vehicle's location, in contradistinction from mere local rotations which change the vehicle's axial orientation and are excluded in the case of gimbal suspension. At any rate, the casing 123 participates in the vehicle's progressive motion to the exclusion of changes of its axial direction. The participation in the progressive motion involves the participation in all accelerations of the vehicle. As pointed out before, an acceleration's co-ordinate or component in the direction of the axis of the element 107 causes the motor 105 to run at a speed and in a direction corresponding to said component. The shaft 106 is either directly coupled to the rotor of the motor 105 or connected thereto by an intermediate gear, preferably a speed reducing gear. Anyhow, the shaft 106 rotates at a speed proportional to the motor's speed and shifts the sled 102 over a distance proportional to the intensity of said component and to the duration of the acceleration. So the total shift of the sled 102 is proportional to the total acceleration in the direction of said component or to the change of speed which the vehicle acquires due to said component.

The element 112 operates similarly with respect to that co-ordinate of the acceleration which is in the direction of the axis of the element 112. Consequently, the motor 111, controlled by the element 112 in the same way as the motor 105 is controlled by the element 107, shifts the sled 108 over a distance proportional to the change of speed which the vehicle acquires due to said second component of the acceleration. In addition, the sled 108 participates in the shift of the sled 102 so that the total shift of the sled 108 corresponds to the geometric sum of both co-ordinates or to the true change of speed acquired by the vehicle due to the total acceleration.

When the acceleration has ceased, the motors cease rotating and the sleds remain in the shifted positions until a new acceleration occurs. Any further acceleration causes an additional shift of the sled 108, said shift corresponding to the direction, intensity and duration of the acceleration, whereby the total shift is the geometric sum of all single shifts which have occurred. The total shift representing the total change of speed is indicated by the shift of the pin 120 over the plate 116.

In a strictly correct sense, the indicated speed is the speed of the instrument or the elements used in the instrument, and not the speed of the vehicle. The indicated speed may temporarily differ a little from the speed of the vehicle's center of gravity because the latter center may not coincide with the centers of the elements 107 and 112 and may have a slightly different acceleration when the vehicle does not move parallel to itself. This difference, however, is negligible because the instrument and the vehicle are so connected that their speeds and ways must be substantially the same whether or not slight temporary differences occur. Therefore, the possibility of such temporary differences is neglected in this specification, and the speed and the way of the instrument is regarded as identical with the speed and the way of the vehicle.

The pin 120 may start from any position relative to the plate 116. But preferably, the pin 120 is originally positioned over the center 118 of the plate 116. The pin can be brought into this or any other desired position by turning the shafts 106 and 113 either together with the respective motors or while said shafts are temporarily disconnected from their respective motors.

If the pin was positioned over the center of the plate 116 before the vehicle started, the direction from this center (118) to the present position of the pin 120 defines the direction of the dial 117 and indicates the direction of the vehicle's speed. The distance of the pin 120 from the center 118 indicates the magnitude of this speed. These indications can be read from the scales described before. For example, if the axis of the element 107 is directed from the north to the south and the axis of the element from the east to the west, a direction of the dial 117 toward the scale point N indicates a speed directed to the north and a direction of the dial toward a point which is $x$ degrees remote from N on the peripheral scale indicates a speed having a direction deviating from the north by $x$ degrees. The diameter of the plate 116 and the length of the scale in the groove 119 of the dial 117 are large enough to provide for the largest speed which the vehicle might acquire.

The inventive device may be modified in such a way that the movable part 114 carries the plate and the stationary body 100 carries the pin. This modification requires only obvious adaptations of the accessories for the achievement of the same indications.

That part of the instrument which is shown in the lower half of the Fig. 3 serves the indication of the track or the way made by the vehicle and is controlled by the speed indicating device described before.

The sled 152 guided in a groove 153 in the finished surface 151 of the body 100 moves over said surface when the motor 155 drives the threaded shaft 156, the shapes and arrangements of these parts being similar to those of the sled 102, motor 105 and shaft 106. The operation of the motor 155 is controlled by a variable resistance 157 inserted in the body 100 at the bottom of the groove 103 and adjusted by a sliding contact affixed to the lower extension of the sled 102. The resistance 157 is so arranged and measured that the motor 155 is switched off when the sled 102 is in its central position, that the motor turns in one direction when the sled 102 is shifted from the central position to one side and turns in the other direction when the sled is shifted to the other side whereby the rotation of the motor 155 and of the shaft 156 always moves the sled 152 in that direction in which the sled 102 is shifted from its central position, and that the speeds of the motor 155 and of the sled 152 are proportional to the distance of the sled 102 from its central position.

An adequate arrangement of the resistance 157 and of the parts controlled by the same can be secured in the same manner as has been described before with reference to the resistances 132 and 133.

It results that the shifting speed of the sled 152 is always proportional to that co-ordinate of the vehicle's speed which is indicated by the position of the sled 102 as has been pointed out before, and that the total shift of the sled 152 is proportional to the vehicle's total way made in the direction of said co-ordinate.

The sled 158, groove 160, motor 161 and shaft 163 are shaped and arranged with respect to each other and to the sled 152 in a similar manner as the sled 108, groove 110, motor 111 and shaft 113 are shaped and arranged with respect to the sled 102. The motor 161 is controlled by a variable resistance 162 inserted at the bottom of the groove 110 and adjusted by a sliding contact 159 affixed to the extension 109 of the sled 108. The arrangement of the resistance 162 corresponds to the arrangement of the resistance 157 whereby the motor 161 is so controlled that said motor moves the sled 158 in that direction in which the sled 108 is shifted from its central position, and at a speed proportional to the distance of the sled 108 from said central position. So the moving speed of the sled 158 is proportional to that coordinate of the vehicle's speed which is indicated by the position of the sled 108.

As the sled 158, in addition, participates in the movement of the sled 152, the total movement of the sled 158 comprises both co-ordinates and corresponds to the direction and speed of the vehicle's total motion. The total shift of the sled 158 indicates the total way made by the vehicle, and said shift occurs in a track which is a proportional picture of the vehicle's true track.

A rod or indicator 164 is affixed to the sled 158 and has a free end 165 which moves over a plate 166 when the sleds 152 and 158 move. The plate 166 is affixed to the body 100 and has an upper surface parallel to the movability of the end 165. This surface is provided with an exchangeable map of that part of the earth where the vehicle is travelling. The end 165 may be provided with a needle, a pencil or another writing implement which draws a line 167 indicating the vehicle's track on said map.

At the start, the end 165 or the writing implement affixed thereto is brought over that spot of the map which indicates the geographic position of the starting point. This can be done in the manner, described before, in which the pin 120 is brought into its original position. At any later time, the end 165 stands over that spot of the map which indicates the geographic position at that particular time.

If it is expected that the vehicle will go farther than to the line indicated by the rim of the map, a set of maps may be kept in store, each subsequent map having a margin zone overlapping with margin of the preceding map. Before the line 167 reaches the rim of the map, the map is replaced by the subsequent map, and the end 165 is brought in that position over the new map which indicates the same spot that was last indicated on the first map.

If one map covers a considerable part of the earth's surface, the curvature of the earth may interfere with the accuracy of the indication. This can be avoided by an embodiment wherein a curved map forming a portion of a globular surface and showing a proportional picture of the earth's surface is used. Such a modification differs from that shown in Figs. 1, 2 and 3 in that the indicating needle or the writing implement is guided in a globularly curved way. This can be achieved by two sleds, corresponding to the sleds 152 and 158, which, in contradistinction from the sleds 152 and 158, are guided and driven in two circular arcs perpendicular to each other. The instrument modified in this manner comprises a way or track indicating device different from that shown in the lower half of the Fig. 3, and the modification of this track indicating device is shown in Figs. 7, 8 and 9 while Fig. 1 represents that part of the modified embodiment which is identical to the preceding embodiment.

Referring to Figs. 7, 8 and 9, the body 170 is permanently affixed to the body 100 (Fig. 1) and has a cylindrical surface 171 with a groove 173 in which a sled 172 is circularly guided. A motor 175 mounted on the body 170 drives a worm shaft 176 engaging a worm wheel arc 177 affixed to the sled 172 whereby rotation of the motor 175 shifts the sled 172 along the circular groove 173. The motor 175 is controlled by the position of the sled 102 in a similar manner as the motor 155 in the precedent modification.

The sled 172 carries a second sled 178 guided in a circular groove 180 of the sled 172. The respective axes of the circles defined by the two grooves 173 and 180 cross each other perpendicularly. An integral extension 174 of the sled 172 carries a motor 181 controlled by the position of the sled 108 in a similar manner as the motor 161 in the precedent modification. The motor 181 moves the sled 178 in a manner corresponding to the drive of the sled 172 by means of a worm gear 183.

The rod 184 carrying the writing or indicating implement 185 is affixed to the sled 178. The implement 185 moves over the globularly curved surface 186 which is affixed to the body 170 and provided with a map. The center of curvature of the surface 186 coincides with the crossing point of the axes around which the sleds 172 and 178 move.

Figure 11:
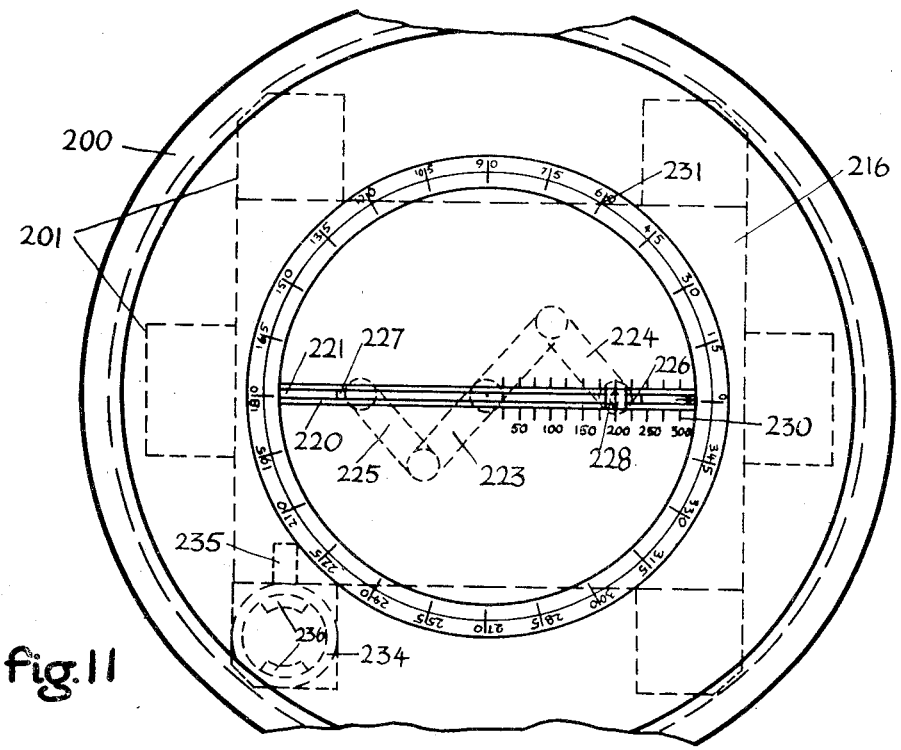
Figure 12:
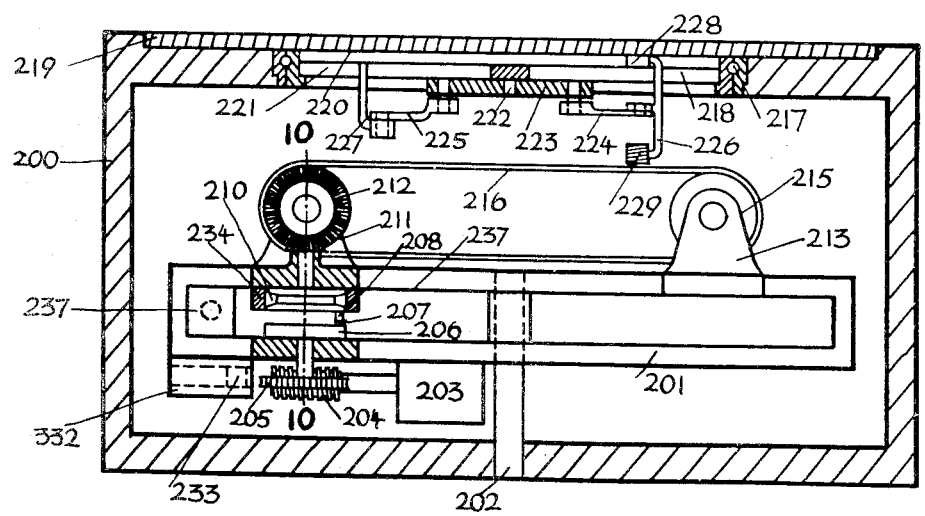
Fig. 12 shows a view of the same embodiment seen from the left side in Figs. 10 and 11, the casing being shown in central cross-section, and some inner parts being shown in a cross-section taken along the line 12—12 in Fig. 10.

Referring to Figs. 10, 11 and 12, numeral 200 indicates the casing of another embodiment. The direction or orientation in space of this casing may be maintained by such means as have been described before. A frame-shaped member 201 is rotatably carried by a vertical axle 202 affixed to the casing 200. The frame 201 carries wing-shaped extensions and certain other parts which will be described thereafter, and this entire structure is so arranged that the center of gravity of the total rotatable structure is situated in that central plane of said frame which is vertical in Fig. 10, and remote from the axis of rotation to the left side in Fig. 12 whereby the inertia will direct the frame 201 according to the direction of an occurring acceleration.

A motor 203 is mounted on the frame 201 and drives a worm gear 204 engaging a worm wheel 205. The wheel 205 has a shaft rotatable in a bearing in an extension of the frame 201 and carrying a disk 206. A grooved disk 210 situated parallel to the disk 206 is affixed to another shaft which is also rotatable in a bearing of the frame 201 and carries a horizontal toothed wheel 211 engaging a vertical toothed wheel 212. The two disks 206 and 210 are so connected to each other that the rotation of the disk 206 is transferred to the disk 210 and that the latter will move, in the long run, as much as the first disk has moved, but that the disk 210 is free to lag temporarily when its motion is stopped or braked while the disk 206 continues rotating. This is achieved in the shown embodiment by providing a pin 207 affixed to the disk 206, a pin 208 affixed to the disk 210 and a spring 209 connecting said two pins. The resiliency of the spring 209 and the position of the pins does not need to allow for more than a small difference in the distance of the pins because the disk 210 will never be stopped for any considerable length of time as will be explained later.

A pair of co-axial bearings 213 is mounted on the frame 201 and carries the shaft of a cylindrical roller 214. The toothed wheel 212 is affixed to the same shaft whereby the drive of the motor 203 is finally transferred to the roller 214. A similar pair of bearings 213 mounted on the frame 201 carries the shaft of a roller 215 similar to the roller 214 and parallel thereto. An endless belt or band 216 of magnetic or magnetizable material is slung around the rollers 214 and 215 and driven by the roller 214 in such sense that the upper half of the band 216 moves in the direction of the acceleration (from left to right in Fig. 12) when the roller 214 is driven by the motor 203.

The upper wall of the casing 200 has a central circular opening the edge of which carries a ball bearing 217. The outer ring of this bearing rests stationary on the casing. The rotatable inner ring carries a disk 218 affixed thereto and filling the opening of the casing 200. A stationary disk or pane 219 of glass or other transparent material covers the opening and the disk 218 which is visible through the pane 219.

A groove 220 which is slightly broader at the upper side than at the lower side crosses the disk 218 diagonally. The bottom of the groove 220 is slotted, except at the center of the disk 220, by a slot 221 interrupted at the central part of the disk 220. A pin 222 affixed to the center of the disk 220 extends downward and rotatably carries a horizontal lever 223 having ends which are linked by joints to the arms 224 and 225 respectively. The other end of the arm 224 is linked by a joint to the member 226 a vertical extension of which is guided in the slot 221. The other end of the arm 225 is linked to a member 227 having a vertical extension guided in that part of the slot 221 which is opposite to the part in which the member 226 is guided. The upper end of the member 226 passes through the slot 221 and terminates in a sliding block 228 which is slidable in the groove 220. The lower end of the member 226 carries a piece 229 of magnetizable material which can be temporarily magnetized by current from any suitable source (not shown) and thereby temporarily coupled to the band 216. The centers of the block 228, of the joint connecting the parts 224 and 226, and of the magnet 229 are arranged in one vertical line. The parts 223, 224, 225, 226, 227, 228 and 229 are so shaped and loaded with weight that the center of gravity of this entire movable system is always kept in the same place, preferably in the central axis of the disk 218, whatever the distance of the sliding stone from the center of said disk might be. Said distance may vary from zero to a maximum near the outer rim of the disk 218 and can be read from a scale 230 provided at the sides of the groove 220 and visible through the pane 219. Another, circular scale 231 is provided on the pane 219 and allows to read the angular position of the rotatable disk 218 or of its groove 220.

A control element 232 similar to the device 123 shown in Figs. 4, 5 and 6 is mounted on the frame 201 and controls the speed of the motor 203 in a similar manner at the element 107 described before controls the speed of the motor 105. A difference, however, exists in that the motor 203 needs not to run in both directions and, therefore, the inert member 233 of the element 232 may be movable only in one direction from its original or resting position, and the element may contain only one control resistance. The axis of the element 232 lies horizontally in the vertical central plane of the frame 201 and the inert member 233 moves from its original position to the side remote from the center of rotation of the frame when an acceleration occurs. Thereby the speed of the motor 203 is made proportional to the acceleration. The motor's rotation is so directed that the upper side of the band 216 is driven in the direction of the acceleration.

A ring 234 is arranged around the disk 218 and slightly movable in a horizontal direction perpendicular to the axis of the element 232, the ring 234 having an extension 235 slidably fitting a guiding hole in the frame 201. Two braking blocks 236 are affixed to the ring 234 and extend into the peripheral groove of the disk 218. When no acceleration in the direction of the ring's movability exists, the disk 218 is free to rotate. When, however an accelerating component perpendicular to the axis of the element 232 exists, the one or the other block 236 is pressed into the groove of the disks 218 and stops the rotation of said disk, thereby interrupting the transmission of the motor's drive to the band 216. This braking operation of the ring 232 may be caused either by its own inertia or by an element 237 similar to the device 123 shown in Figs. 4, 5 and 6 and having an axis perpendicular to the axis of the element 232 which element 237 controls the motion and pressure of the ring 235 in any suitable or known (not shown) manner.

The magnetic coupling between the piece 229 and the band 216 is operated only when the band is driven by the motor and interrupted when the disk 218 is stopped, for example by interrupting the current magnetizing the piece 229. This may be done in any suitable or conventional manner, for example, by providing a switch in the circuit of said current which switch is operated by the extension 235 of the ring 234, by the element 237, by the roller 214 or by any other suitable part.

One or several counterweights 238 are affixed to the frame 201 at the side opposite to the side where the transmission gear is situated (see Fig. 10) whereby the center of gravity of the entire frame system is brought into the proper position before described.

*Operation*

This instrument operates as follows:

At the start of the vehicle, the block 228 is positioned in the center of the disk 218. When the vehicle is accelerated, the inertia of the frame system causes the same to turn around the shaft 202 into that position in which the center of gravity of this system lies behind the center of rotation in the sense of the acceleration. At the same time, the inert member 233 shifts and the motor 203 controlled by the element 232 runs at a speed proportional to the magnitude of the acceleration. This motion is transferred to the band 216 the upper part of which moves in the direction of the acceleration, also at a proportional speed. During said motion of the band 216, a magnetic coupling exists between the band 216 and magnetic piece 224 whereby the latter, the member 226 and the sliding block 228 are shifted in the direction of the acceleration over a way proportional to the intensity and length of time of the acceleration. The total velocity of the vehicle acquired by the acceleration is represented by the elongation of the block 228 from its central position and can be read from the scale 230. At the same time, the rotatable disk 218 assumes that direction in which the groove 220 falls into the direction of the acceleration or of the velocity of the vehicle. This direction can be read from the scale 231.

At the beginning of the acceleration, a short time may elapse before the frame 201 reaches the proper direction. Whenever the frame is not so directed that the axis of the member 232 falls into the direction of the acceleration, a component of the acceleration falls into the direction of the axis of the member 231 or of the ring extension 235.

As has been pointed out before, such component of the acceleration or the corresponding inertia causes the one or the other of the braking blocks 236 to stop the disk 210 whereby also the band 216 is stopped while the motor 203 and the disk 206 continue the motion controlled by the element 232. As soon as the frame 201 is in the direction of the acceleration, the component of inertia perpendicular to this direction vanishes whereby the disk 210 is released. At this moment, the spring 209 causes the disk 210 to make up for the lagging or for that partial rotation which the disk 206 made during the stop of the disk 210. The releasing position is reached after a very short time from the beginning of the acceleration. Even if the frame should oscillate for some time around the direction of the acceleration, the inertia controlling the stop of the disk 210 will soon and repeatedly pass through the value zero when the frame passes through the proper direction whereby the disk 210 will make up for the delayed motion in short intervals. It results that the band 216, in the long run, makes the complete movement corresponding to the movement of the motor 203, and that this movement of the band occurs completely in the direction of the acceleration. The same is true with respect to the magnetic piece 229 and the indicating block 228.

When the acceleration of the vehicle ceases, the motor 203, the band 216 and the block 228 cease moving, and the vector from the center of the disk 218 to the center of the block 228 indicates the velocity so far acquired by the vehicle. The beginning and the end of the movement of the device may lag a little behind the beginning and the end of the acceleration, due to the inertia of the moving parts. But this does not matter as the entire movement will finally correspond to the entire acceleration with sufficient accuracy and the indication will lag only a very short time behind the indicated facts. This is true also with respect to the other embodiments.

Whenever another acceleration of the vehicle occurs, the process is correspondingly repeated, that is, the block 228 is again shifted in the direction of the new acceleration over a distance proportional to the magnitude and duration of the new acceleration, that is to say, over a vector representing the change of the vehicle's velocity due to the new acceleration. This vector added to the former position of the block 228 results in a new vector measured from the center of the disk 218 to the center of the block 228 and representing the total velocity of the vehicle. The direction and magnitude of the total velocity can always be read from the scales 231 and 230 respectively.

This embodiment has been shown to be an instrument for the indication of accelerations and velocities. It may, however, also be used in an instrument for the indications of the vehicle's way or position. Therefor, the indication of the velocity may be used for the control of a second indicating implement which moves at the indicated speed and in the indicated direction over a map or a similar surface. This can be done in a manner similar to that which has been pointed out with respect to the embodiments shown in Figs. 1 to 3 and 7 to 9.

Referring to Fig. 13, 250 indicates an electric current source. One terminal of 250 is connected to a wire or conductor 251 leading into the interior of a control element of the kind described before with reference to Figs. 4, 5 and 6, for example, of the control element 107 (Figs. 1 and 3). In Fig. 13, the circumference of this element is indicated by the dotted line 252. As described before, the control element contains variable resistances 132, 133, 142, 143 and respectively co-operating sliding contacts 134, 135, 144, 145 carried by an inert member. Said four sliding contacts are conductively connected to wire 251. When the inert member is out of its zero or central position, the sliding contacts connect either the resistances 133 and 143 or 132 and 142 with the current source 250.

The outer end of resistance 132 is connected by wire 253 to one terminal of a reversible electromotor, for example, of motor 105, which has another terminal connected by wire 245 to the second terminal of 250. The outer end of resistance 133 is connected by wire 255 to a third terminal of motor 105. Said motor is so wired or constructed in known manner that current passing the motor between wires 253 and 254 causes rotation of the motor in one direction, and that current passing between wires 255 and 254 causes rotation in the opposite direction.

The outer end of resistance 142 is connected to one end of a coil 256 wound around the electromagnet 137; the other end of 256 is connected to a wire 257 conducting to wire 258, wire 254 and to the second terminal of 250. The outer end of resistance 143 is connected to one end of coil 259 of electromagnet 136; the other end of 259 is connected by wire 260 to wire 258 etc.

The resistances 132, 133, 142 and 143 are divided in partial resistances indicated by individual dents of the respective zig-zag lines. The resistances of the individual parts are measured as described before whereby, in any position of the sliding contacts, the current supply is that required for proper function of the motor 105 and of the electromagnets respectively. As mentioned before and well known in the art, the conductors passing from the interior of the control element to the outside have such a structure, for example excessive length and suitable position, that these conductors do not interfere with the movability of the control element.

Circuits like those described may be used for the control element 112 and for the motor 111 controlled by 112.

Fig. 9 further shows a circuit adapted for the operation of motor 161 (Fig. 3). This circuit contains the same source 250 and the sliding contact 159 affixed mechanically to sled 108 and connected electrically to wire 251. Contact 159 controls the variable resistance 162 which consists of two symmetrical parts separated by a zero gap. The two outer ends of said parts are connected to different terminals of the reversible motor 161 by wire 261 and wire 262 respectively. Said two terminals correspond to opposite directions of rotation and co-operate with a common third terminal pole connected to wire 264, in a manner similar to that described with reference to motor 165.

A circuit like that described in the foregoing paragraph may be used for the control of the motor 155 by the variable resistance 157. Also, such circuits may be used for the control of the motors 175 and 181 in the modification shown in Figs. 7 to 9.

Referring to Fig. 14, 270 indicates an electric current source supplying a control member, for example, the member 232 (Fig. 10) and a motor, for example, the motor 263 by means of a circuit similar to that described with reference to member 167 and motor 165. As mentioned before, the embodiment shown in Figs. 10 to 12 is simplified by the fact that the inert member of the control element 232 and the motor have to move in one direction only. The control element may contain only two resistances 272 and 273 varied by sliding contacts 274 and 275 respectively, which are carried by the inert member 233 and are connected by wire 271 to one terminal of 270. That end of resistance 272 which is opposite to the zero position of contact 274 is connected by wire 276 to one terminal of motor 263, the other terminal of the motor being connected by wire 277 to the second terminal of the current source 270. The corresponding end of resistance 273 is connected to one end of a coil 278 wound around an electro-magnet 279 which serves the same purpose as the electromagnet 136 in the embodiment described previously. The other end of coil 278 is connected by wire 280 to wire 277 and to the second terminal of 270. Said resistances, coil and wires may be measured and adjusted as described before with reference to the embodiments shown in Figs. 1 to 9 and 13.

Fig. 14 further shows another circuit supplied from the same source 270. This circuit conducts from one terminal of 270 over wire 281 to a coil 282 wound around an electromagnet 229 (seen in Fig. 12 from the lower side in Fig. 14) which is positioned near the steel band 216 as described before. The other end of coil 282 is connected to a contact 283 situated stationarily in the control element 273 (Fig. 10) which has a movable inert member carrying a contact 284 connected permanently by wire 285 to the second terminal of 270. In the central or zero position of said inert member, the contacts 283 and 284 close the circuit, thereby magnetically coupling the piece 229 and the band 216 as described before. In any other position of the inert member, for example, in the positions of the contact 284 shown in dotted lines in Fig. 14, the circuit is interrupted and the parts 216 and 229 are free to move relatively to each other.

In any embodiment, all circuits may be supplied by the same current source or by separate current sources.

Every indication or combination of indications obtained from an embodiment of the invention may be used for an automatic control of the vehicle whereby, for example, a predetermined direction of travel over ground or a predetermined speed or a definite way may be secured. This may be done, for example, by motoric means operating the steering mechanism and controlled by electrical contacts which are so positioned and adjusted beside the indicating implement that deviation of said implement from the predetermined indication will operate said contacts and thereby activate the steering mechanism in such sense as will correct said deviation.

Wherever the operation of an embodiment calls for a definite initial position of a part, conventional or easily designed means may be provided for bringing said part into the proper position without disturbing the other parts. For example, the outer casing 122 of the control element shown in Figs. 4, 5 and 6 may be provided with a tool so movable from the outside in or into the inner space of 122 that said tool can temporarily be brought into contact with the inner casing 123 and can direct the casing 123 into the desired direction, for example, into that direction in which the axis of the element is directed from the north to the south.

If any indication of the instrument or the position of any part which, according to this specification, should have a certain position in space should happen to deviate from the proper position (which may result from small inaccuracies summed up during some time) and this deviation appears during a time when outer marks are accessible, the pilot may correct the deviation, and means may be provided which make such corrections easy. Generally, the same means which are used for the initial positioning of the parts will sufficiently serve also for said corrections.

The described embodiments represent devices deriving indications of speed, way etc. from the record of accelerations automatically. While this automatical method is preferred, the invention may be carried out by other methods, for example, by computing the speed, the way etc. from the accelerations, recorded by means of an "inert member," by any known mathematical method, eventually without using any particular device therefor.

In the drawing and description, several details of the embodiments which may be carried out in conventional or known manner have been omitted for the sake of clear and simplified representation of the invention. For example, means to connect parts, means to secure the distance of parts, slight clearances to avoid friction between adjacent parts, the detailed structure of bearings, wires and other conventional electrical elements have not been specified in certain instances.

Means for the temporary arrest or for the protection of the instrument and other special equipment which has been described with respect to one embodiment, may be applied also to other embodiments. Generally, the invention is not confined to the particular forms and uses shown and described, the same being merely illustrative, and the invention may be carried out in other ways without departing from the spirit of the invention as it is obvious that the particular embodiments shown and described are only some of the many that anyone skilled in the art can employ to attain the objects and to accomplish the results of the invention.

We claim:

1. An instrument for the navigation of a vehicle, said instrument comprising a body turnably connected with the vehicle, the turning center coinciding with the center of gravity of said body; two members forming movable parts of said body and guided relative to the other parts of said body; means restricting the inert movement, in said guided direction, of one of said members to a range of different positions corresponding to different accelerations of said turning center; means to control the movement of the other member by the movement of said first member, said latter means moving said second member in a direction opposite to that of said first member whereby the common center of gravity of said two members and consequently of said body is maintained; and means indicating the shift of one of said members which results from said movement of the member.

2. An instrument for the navigation of a vehicle, said instrument comprising a body turnably connected with the vehicle, the turning center coinciding with the center of gravity of said body; two members forming movable parts of said body and guided relative to the other parts of said body in the same straight direction; means restricting the inert movement, in said direction, of one of said members to a range of different positions corresponding to different accelerations of said turning center; means to control the movement of the other member by the movement of said first member, said latter means moving said second member in a direction opposite to that of said first member whereby the common center of gravity of said two members and consequently of said body is maintained; and means indicating the shift of one of said members which results from said movement of the member.

PETER MOSNER.
OTTO STEINITZ.

REFERENCES CITED

The following references are of record in the file of this patent:

UNITED STATES PATENTS

| Number | Name | Date |
|---|---|---|
| 989,958 | Frahm | Apr. 18, 1911 |
| 1,317,072 | Carlier | Sept. 23, 1919 |
| 1,386,953 | Robertson | Aug. 9, 1921 |
| 1,451,923 | Pierce | Apr. 17, 1923 |
| 1,728,904 | Herr | Sept. 17, 1929 |
| 1,813,493 | Henderson | July 7, 1931 |
| 1,823,044 | Holmberg | Sept. 15, 1931 |
| 1,828,564 | Hardesty | Oct. 20, 1931 |
| 2,109,283 | Boykow | Feb. 22, 1938 |
| 2,346,798 | Summers | Apr. 18, 1944 |

FOREIGN PATENTS

| Number | Country | Date |
|---|---|---|
| 474,718 | Great Britain | Nov. 5, 1937 |
| 701,289 | France | Jan. 7, 1931 |
| 719,591 | France | Nov. 23, 1931 |